M. A. WHITING.
SYSTEM OF MOTOR CONTROL.
APPLICATION FILED AUG. 23, 1911.
1,022,908. Patented Apr. 9, 1912.
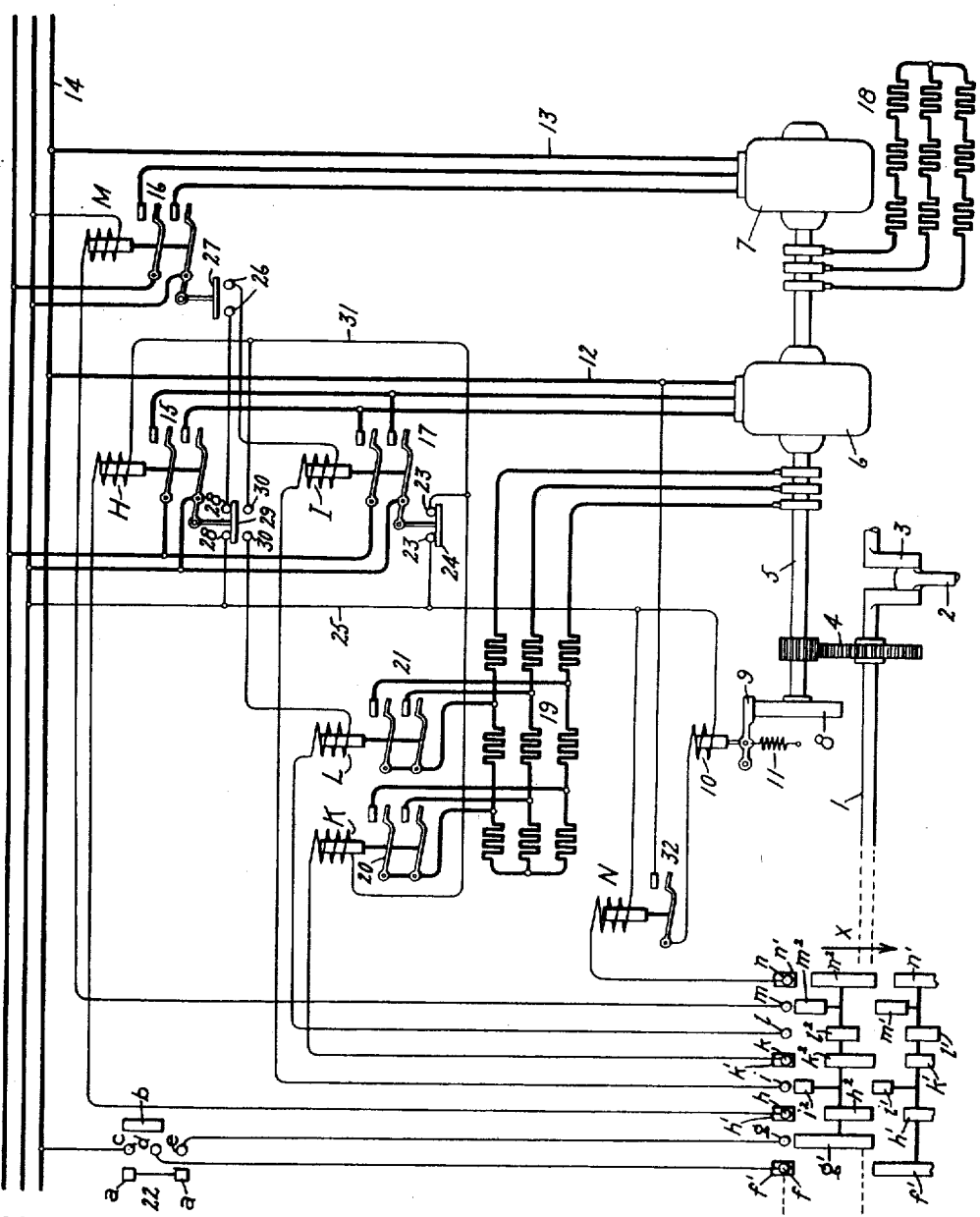
WITNESSES:
J. Ellis Glen
Marcus L. Byng
INVENTOR:
MAX A. WHITING,
BY Albert G. Davis
HIS ATTORNEY.

UNITED STATES PATENT OFFICE.

MAX A. WHITING, OF SCHENECTADY, NEW YORK, ASSIGNOR TO GENERAL ELECTRIC COMPANY, A CORPORATION OF NEW YORK.

SYSTEM OF MOTOR CONTROL.

1,022,908.      Specification of Letters Patent.      Patented Apr. 9, 1912.

Application filed August 23, 1911. Serial No. 645,555.

*To all whom it may concern:*

Be it known that I, MAX A. WHITING, a citizen of the United States, residing at Schenectady, county of Schenectady, State of New York, have invented certain new and useful Improvements in Systems of Motor Control, of which the following is a specification.

This invention relates to systems of controlling electric motors of the alternating current induction type, especially with the view of making it possible to utilize such motors for operating movable objects which have a given range of travel to and fro, such for example as the lifting table of a three-high rolling mill. When a direct current motor is used for such work it can be easily and accurately stopped at the desired instant by disconnecting it from the line and short circuiting it on itself so that it runs as a generator by its own momentum and stops very quickly. Still greater accuracy of stopping can be attained by connecting the armature across a portion of a resister which is connected across the line, whereby the motor is retarded to a definite slow speed after attaining which slow speed the motor is stopped by disconnecting it from the line and short circuiting it upon itself. But while an induction motor will operate as a generator if driven at a speed above synchronism, yet it must remain connected with the supply mains, and as soon as its speed drops to synchronous it begins to operate as a motor without any further reduction in speed. The use of a friction brake to slow down such a motor to a dead stop is objectionable because of the wear of the braking members and the excessive heat generated. If it is attempted to stop the motor by reversing it, the variation in the voltage of the supply current and the changes in load conditions tend to cause a wide variation in the positions at which the lifting table would stop.

My invention aims to overcome these difficulties by using two induction motors, one of which has a considerably higher synchronous speed than the other, preferably about twice that of the other. Both motors are geared to the lifting table, and a circuit-changing limit switch is operatively connected with said motors. The high speed motor starts and accelerates the table; or if desired both the high speed motor and the low speed motor may be used in starting, in which case the low speed motor will be cut out before its synchronous speed is reached. Then the low speed motor is cut in and is driven by the momentum above its synchronous speed operating as a generator and retarding the speed of the table; at about the time the low speed motor is thrown on, the high speed motor is thrown off; before the low speed motor has slowed down to synchronous speed, the high speed motor is thrown on again but in a reversed condition. At half the synchronous speed of the high speed motor, the low speed machine will cease to operate as a generator and will become a motor, whose torque is opposed to that of the high speed motor. The two motor torques will tend to strike a balance at about one-quarter of full high speed. A solenoid brake is then applied by the switch and the table can be readily and accurately stopped thereby with small loss from heat and wear.

The accompanying drawing is a diagram of circuits and apparatus embodying my invention.

1 is a shaft connected in any suitable manner with the object to be moved. If this be the lifting table of a three-high rolling mill, which requires to be shifted up or down alternately a given distance, it can be connected by a rod 2 with a crank 3 in the shaft 1; the desired movement being effected by successive half revolutions of the crank between its upper and its lower dead points. The shaft 1 is suitably connected, as by means of gearing 4, with the shaft 5 upon which are mounted the rotors of two induction motors 6, 7. Upon one or the other of the shafts 1, 5, but preferably the latter, is a brake wheel 8 coöperating with a brake shoe 9 which is operatively related to a solenoid 10. A spring or weight 11 applies the brake when the solenoid is deënergized.

The motor 6 is a high speed motor, its synchronous speed being preferably twice that of the motor 7. Both motors are preferably of the three-phase type. Each motor may consist of a separate rotor and stator, or the two stator windings may be placed on a single stator core and the two rotor windings may be placed on a single rotor core, the windings being connected and used in the same manner as hereafter described for the two motors shown. Their respective leads 12 and 13 are connected to the three-phase supply mains 14; one directly and the other two through double pole contactors 15, 16. A similar contactor 17, in a branch around the contactor 15, operates to reverse the connections of two leads of the motor 6 for the purpose of reversing its direction of rotation. The low speed motor 7 has a resister 18 permanently in circuit with its rotor. Another resister 19 is connected with the rotor of the high speed motor 6, but sections of this can be cut out by means of the double pole contactors 20, 21.

The limit switch is a rotatable drum on the crank shaft 1, provided with suitable segments to coöperate with a row of stationary contact fingers. The drum is shown developed in the drawing; pieces of some of the lower segments being shown broken off and moved up under the fingers.

At 22 is a master switch having two contact segments $a$ $b$ adapted to rest upon buttons $c$, $d$, $e$ and send current from one of the supply mains to either the finger $f$ or the finger $g$ according to the segment in service. Finger $h$ is connected to the actuating coil H of the contactor 15, the circuit being completed through the contacts 23 controlled by a switch 24 which opens when the contactor 17 picks up, thence by the wire 25 to another of the supply mains. Finger $i$ is connected with the coil I of the contactor 17, the circuit being completed through the contacts 26 controlled by a switch 27 which closes when the contactor 16 closes, thence to the contacts 28 controlled by a switch 29 which opens when the contactor 15 picks up; thence to the wire 25. Finger $k$ connects with the coil K of the contactor 20, thence by way of the contacts 23 and switch 24 to the wire 25. Finger $l$ connects with the coil L of the contactor 21, thence by way of the back contacts 30 and switch 29 to a wire 31, and thence via contacts 23 and switch 24 to wire 25. The switch 29 closes on the back contacts 30 when the contactor 15 picks up. Finger $m$ connects with the coil M of the contactor 16 and thence direct to the proper supply main. Finger $n$ connects with the coil N of the contactor 32 and thence to wire 25. The contactor 32 closes the circuit of the brake solenoid 10.

The limit switch has a plurality of segments divided into two separate sets. All the segments in each set are electrically connected. Each set makes the necessary circuit changes to give the shaft 1 a half revolution and then stop it. The segments in one set are duplicates of those in the other set except that the segment $f'$ which makes contact with the current supply finger $f$ for one set is not located in the same plane of revolution as the segment $g'$ which coöperates with the supply finger $g$. The segments travel in the direction of the arrow X.

Assuming the switch to stand as shown in the drawing, let the master switch 22 be thrown to the left, to energize the finger $f$, the segment $f'$ and the other segments $h'$, $i'$, $k'$, $l'$, $m'$, $n'$ in the lower half of the switch. Current will flow to the coils H, K and N, causing those contactors to pick up. The first closes the circuit of the high speed motor 6 and also throws the switch 29 down on the contacts 30 in the circuit of the coil L. The second cuts out simultaneously part of the resister 19 in order to give the proper initial torque. The contactor N closes the circuit of the brake solenoid 10 and releases the brake 9 from the wheel 8. The starting of the motor 6 starts the crank shaft 1, and with it rotates the limit switch. As the segments move under the fingers, current is presently sent through finger $l$ energizing coil L and causing contactor 21 to pick up and cut out another section of the resister 19. This further accelerates the motor 6.

When the crank shaft 1 has made a little more than a quarter revolution, the fingers $h$, $k$ and $l$ run off their segments $h'$, $k'$, $l'$ which open circuits the motor 6 and cuts in all the resister 19. At the same instant, or a trifle before if desired, the finger $m$ makes contact with a segment $m'$ and thereby energizes the coil M of the contactor 16 which closes the circuit of the low speed motor 7. Inasmuch as the speed of the shaft 5 at this instant is greater than the synchronous speed of the motor 7, the stator of motor 7 will generate power which will pass into the supply mains 14. This puts a load on the shaft 5 which acts to retard said shaft. A little later the segment $i'$ makes contact with the finger $i$, energizing the coil I of the contactor 17, which closes the circuit of the high speed motor, but in a reverse direction. This additional load still further reduces the speed of the shafts 5 and 1, until it drops below the synchronous speed of the motor 7. The two motors are now exerting opposite torques on the shaft 5, motor 7 now tending to maintain the rotation and motor 6 continuing to oppose the rotation. The resisters 18, 19 are so proportioned that the motors tend to come to a balance when the forward speed of the shaft 5 is about one-fourth that of its full speed. This low rate of rotation can be easily checked by the brake at small loss from heat and wear. The circuits may be so arranged that the contactor 32 will open simultaneously with the opening of the two contactors 16 and 17. In the arrangement shown, however, the energizing segment $n'$ for the coil N ends slightly before the ends of energizing segment $f'$. When the segment $n'$ runs out from under finger $n$, contactor 32 is opened and thereby deënergizes the brake solenoid 10. An instant after segment $n'$ runs out from under finger $n$, segment $f'$ runs out from under finger $f$ and thereby opens contactors 17 and 16. At practically the same instant that contactors 16 and 17 open, the brake shoe 9 takes effect on the brake wheel 8 and the motors come to a stop with the crank 3 on its upper dead center. In this position the segment $g'$ makes contact with the finger $g$ and the segments $h^2$, $k^2$ and $n^2$ close on their fingers. But no current will flow through them, because the finger $g$ is not energized.

In case the master controller is thrown off before the table completes a trip, it may be necessary to start up on the torque of the low speed motor. Now in certain positions of the limit switch if the equipment is started up after the accidental shut down, the high speed and low speed motors will be opposing one another. It will, therefore, be advantageous not to close the reverse circuit of the high speed motor until an instant after the low speed motor is closed. This will be accomplished by the interlock disk 27 without in any way affecting the normal operation of the equipment. To send current to finger $g$ and thus cause the shaft 1 to make another half revolution back to the starting point shown in the drawing, the master switch 22 must be thrown to the right to bring segment $a$ on buttons $e\ e$. This will send current through finger $g$ and segment $g'$ to the upper half of the switch, and the cycle of operations previously described will be repeated. In this way, using alternating current motors, I am enabled to effect intermittent movements up and down or to and fro of any movable member to which such movements are to be imparted, and I am enabled to stop such movements automatically and accurately. In view of the increasing installation of induction motors and other alternating current machines in manufacturing and other establishments, the invention is regarded as one of especial value.

In some cases a somewhat more elaborate arrangement might be preferred than the one shown by the drawing. The system shown by the drawing requires that successive upward and downward movements of the table must both be accomplished always by an operation of the crank shaft in one direction and it is contemplated that in regular service the table will always be allowed to make its complete travel. At times it may be desired to arrange so that by reversing the master controller the table can be reversed in mid travel and return to the starting point. In this case an additional contactor and some additional interlocks and limit switch segments and some changes in control wiring will be required. The upward motion of the table will be accomplished by running the motors in one direction for a half revolution of the crank, and the downward motion will be accomplished by running the motors in the opposite direction. The torque characteristics of the motors will be entirely similar and will be utilized in the same manner.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a rotatable shaft, of two induction motors, one having greater synchronous speed than the other, two electromagnetic switches respectively in circuit with said motors, a reversing switch for the high speed motor, and a limit switch driven by said shaft and controlling the aforesaid switches.

2. The combination with a rotatable shaft, of two induction motors, one having greater synchronous speed than the other, means for starting and accelerating the high speed motor, means for cutting in the low speed motor to operate by momentum as a generator above synchronism, means for reversing the high speed motor, and a brake for finally stopping said shaft.

3. The combination with a rotatable shaft, of two induction motors, one having a greater synchronous speed than the other, means for causing the high speed motor to drive said shaft above the synchronous speed of the other motor, means for causing said low speed motor to oppose the torque of the high speed motor, means for causing the high speed motor to oppose the torque of the low speed motor when the latter reaches its synchronous speed, and a brake for completing the stopping of the shaft.

4. The combination with a rotatable shaft, of two induction motors, one having a greater synchronous speed than the other, resisters in circuit with the rotors of said motors, contactors controlling the stator circuits of said motors, a reversing contactor in circuit with the high speed motor, contactors for cutting out portions of the high speed motor resister, an electrically-released brake for said shaft, a contactor controlling said brake, and a limit switch rotating with said shaft and controlling the actuating coils of all said contactors.

5. The combination with a shaft, of two induction motors, one having a greater synchronous speed than the other, electromagnetic switches for controlling said motors and for reversing the high speed motor, a limit switch rotating with said shaft and having two duplicate sets of segments arranged in succession, fingers coöperating with said segments and connected with said switches, and a master switch for energizing either set of contacts at will.

6. The combination with a shaft, of two induction motors, and means for causing one of said motors to exert a forward torque, for causing the other motor to oppose said forward torque, for reversing the first-named motor, and for causing the second motor to oppose a forward torque to the backward torque exerted by the first.

In witness whereof, I have hereunto set my hand this 22nd day of August, 1911.

MAX A. WHITING.

Witnesses:
BENJAMIN B. HULL,
HELEN ORFORD.

Copies of this patent may be obtained for five cents each, by addressing the "Commissioner of Patents, Washington, D. C."